No. 839,711. PATENTED DEC. 25, 1906.
J. BIJUR.
STORAGE BATTERY PLATE.
APPLICATION FILED AUG. 15, 1906.
2 SHEETS—SHEET 1.
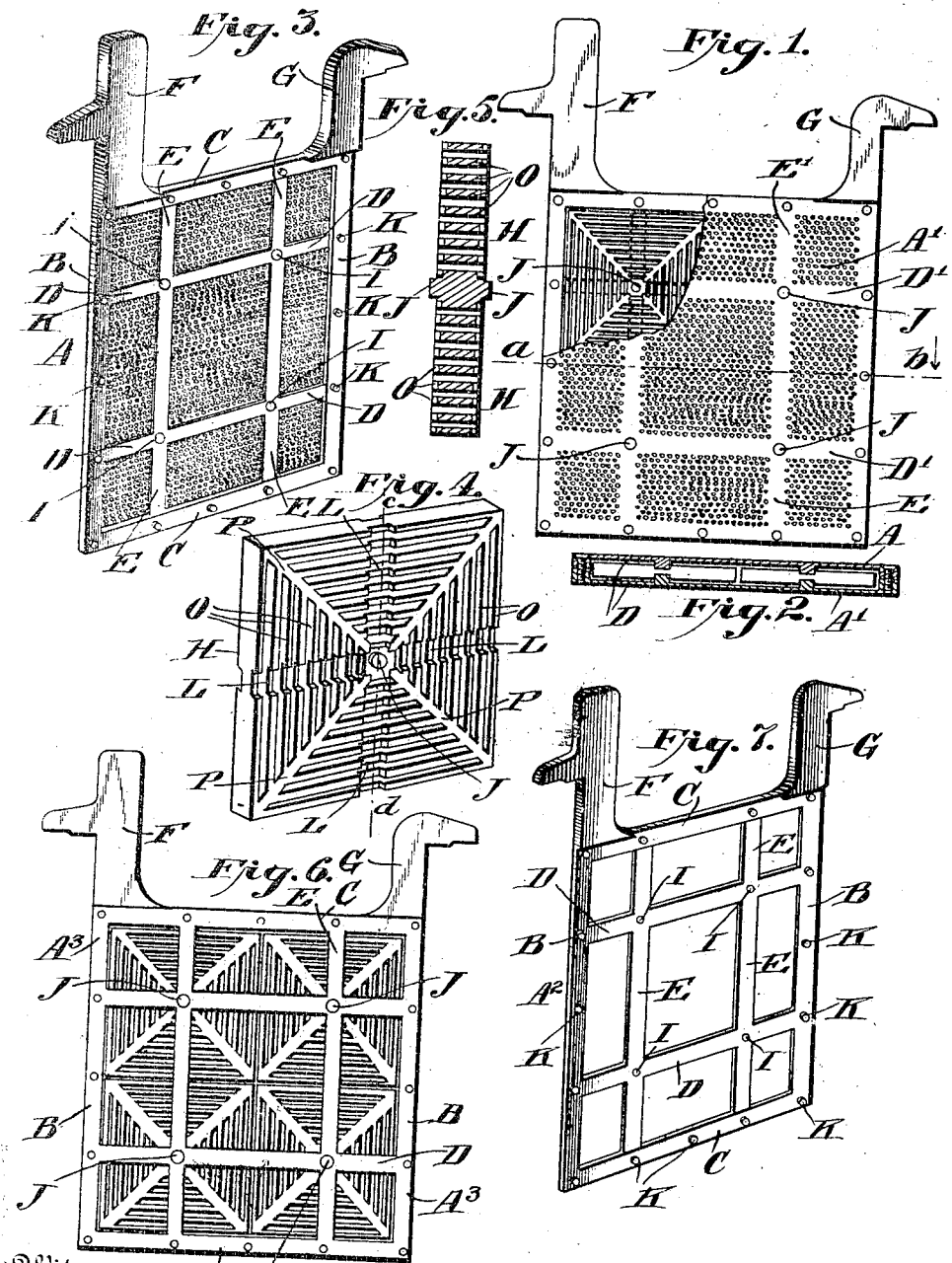

No. 839,711. PATENTED DEC. 25. 1906.
J. BIJUR.
STORAGE BATTERY PLATE.
APPLICATION FILED AUG. 15, 1906.

2 SHEETS—SHEET 2.

Attest:
N. C. Mitchell
A. L. O'Brien

Inventor:
Joseph Bijur
by Dickerson, Brown,
Raegener & Binney
Attys.

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

STORAGE-BATTERY PLATE.

No. 839,711.      Specification of Letters Patent.      Patented Dec. 25, 1906.

Application filed August 15, 1906. Serial No. 330,639.

*To all whom it may concern:*

Be it known that I, JOSEPH BIJUR, a citizen of the United States, and a resident of the borough of Manhattan, city, county, and State of New York, have invented certain new and useful Improvements in Storage-Battery Plates, of which the following is a specification, accompanied by drawings.

This invention relates particularly to Planté storage batteries, in which the active material is "formed" out of and upon lead portions of the electrodes by chemical or electrochemical action. The many advantages of the Planté type of plate are well recognized in this art; and the object of the present invention is to devise such a battery-plate that shall be cheap to manufacture and that by reason of its design avoids undue pressure of the oxid upon the frame and of the frame upon the oxid and the consequent straining or deformation of the parts. Expansion of the individual elements of the plate is permitted substantially in all directions.

Further objects of the invention will hereinafter appear; and to these ends the invention consists of a storage-battery plate for carrying out the above objects embodying the features of construction, combinations of elements, and arrangement of parts having the general mode of operation substantially as hereinafter fully described and claimed in this specification and shown in the accompanying drawings, in which—

Figure 8:
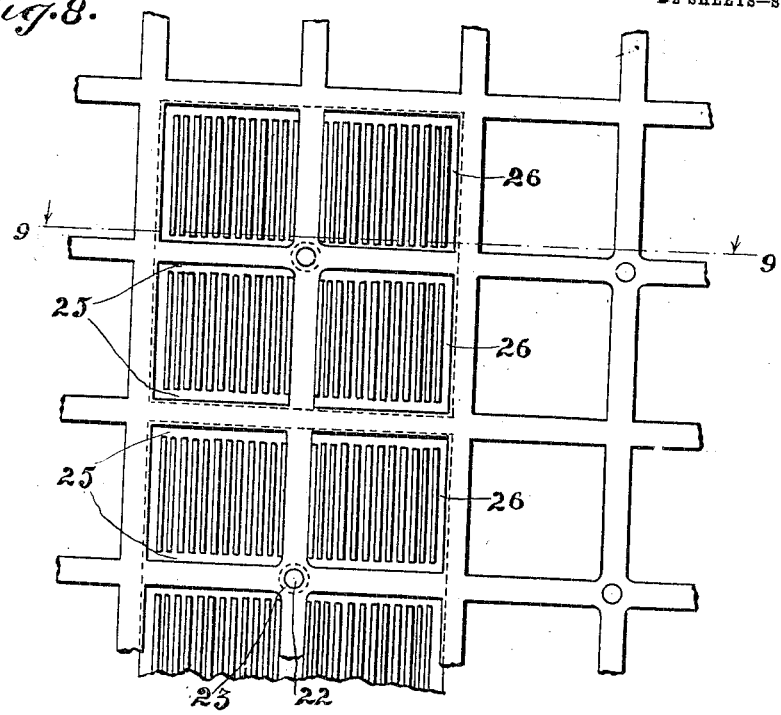
Figure 9:
Figure 10:
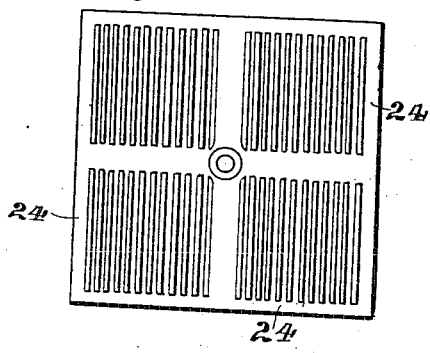
Figure 11:
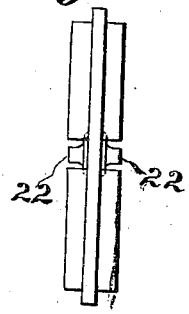

Figure 1 is a side elevation, partly broken away, of a plate embodying the invention. Fig. 2 is a horizontal sectional view of the same on the line *a b* of Fig. 1. Fig. 3 is a side elevation in perspective of one of the outside frames of the plate, viewed from the inside. Fig. 4 is a perspective view of one of the grills. Fig. 5 is a vertical sectional view of the grill on the line *c d* of Fig. 4. Fig. 6 is a side elevation of a form of the plate having no outside covering, and Fig. 7 is a side elevation in perspective of one of the frames for the plate shown in Fig. 6, viewed from the inside. Fig. 8 is a detail face view of a modification. Fig. 9 is a sectional view on line 9 9 of Fig. 8. Fig. 10 is a detail view of a modified form of grill, and Fig. 11 is a side view of the grill.

According to this invention the plate is made up of a plurality of independent elements or units supported in suitable frames in such manner as to permit the necessary expansion and contraction in the plate without distorting the same. The plate may or may not have an outside covering, as desired.

In the drawings, A represents a suitable supporting-framework for the plate, the body of which in this instance is perforated, as shown, which forms a covering for the grills. Within the sides B and the ends C of the framework are provided the reinforcing transverse ribs D and longitudinal ribs E. The perforated body of the frame and the sides, ends, and ribs may all be made integral, if desired. Suitable lugs F and G are provided connected to the frame for supporting the same.

The grills H are adapted to be centrally supported at the intersections of the transverse and longitudinal ribs D and E, and another perforated frame A', substantially like the frame A without the lugs, is then placed outside of the grills and suitably secured to the frame A, as by means of the screws or rivets K or by lead-burning. The perforated frame A' is also provided with transverse ribs D' and longitudinal ribs E', the intersections of which fall opposite the intersections of the ribs D and E of the frame A.

Suitable means are provided for centrally supporting the grills, and in this instance the intersections of the ribs on the frames are provided with apertures I, into which lugs or projections or trunnions J on the grills H project. In the plates illustrated four grills are shown supported upon the framework to constitute the plate, and the dimensions of the grills and the frames are such that the grills do not touch each other nor the framework at any points except at the pivotal points of the grills, thereby permitting free expansion in all directions. In this instance the grills are provided with grooves or recesses L, into which the ribs on the frames project, and thereby center the grills and hold them in proper relation one to the other. Any suitable means may be provided for so centering the grills.

The grills H may be constructed in any suitable manner, and in this instance they comprise constructions suitable for formation, consisting of parallel strips O, connected to diagonal or cross supports P, thereby dividing the plate into segments or quarters of pyramidal form. Between the strips O are intervals, as shown. Any other suitable construction of grill may be provided, and variations of the construction shown may be devised in which the grill is divided in different geometrical arrangements. The construction described, however, has been found to operate satisfactorily and well. When the grills are arranged in the frames, their general appearance is like that indicated in Fig. 6, from which it will be seen that the sides and ends of the grills do not touch the framework, nor do they touch each other at any points.

It is to be understood that the grills are arranged in Fig. 1 like Fig. 6. From an inspection of Fig. 2 it will be seen that the faces of the grills do not touch the frames except at the pivotal points.

In Figs. 6 and 7 a construction like Fig. 1 is shown, with the exception that the frames $A^2$ and $A^3$ are not provided with perforated body portions, but consist of the sides and ends B and C and the ribs D and E. One of the frames, as $A^2$, is provided with the lugs F and G. The grills are supported, as described, in apertures I at the intersections of the ribs.

In Figs. 8, 9, 10, and 11 a modification of the plate is shown in which the grill is provided with a central web 20, forming a supporting and conducting body or member for the ribs 21. The grill is provided with lugs 22, which are thrust through the holes 23 in the frame, and these lugs are burned or riveted or otherwise secured to the frame. The central rib 20 is extended on all sides, so that the edges 24 project beyond the cross-ribs of the frame to keep the edges from curling over out of the plane of the plate or warping. The ribs 21 do not extend to the frame; but spaces 25 are left opposite their ends to allow for expansion, while spaces 26 are left opposite their sides to allow for expansion.

Obviously some features of this invention may be used without others and the invention may be embodied in widely-varying forms.

Therefore, without limiting the invention to the devices shown and described and without enumerating equivalents, I claim, and desire to obtain by Letters Patent, the following:

1. A battery-plate comprising frames having sides and ends and intersecting ribs, active members in the form of unit elements supported at their central portions upon the intersections of said ribs, and means for securing the frames to each other.

2. A battery-plate comprising frames having sides and ends and transverse and longitudinal ribs, active members in the form of unit elements centrally supported between the frames at the intersections of said transverse and longitudinal ribs without touching adjacent unit elements and without touching the frames except at the supporting-points when first arranged in position, and means for centering said elements.

3. A battery-plate comprising frames having cross-ribs, said ribs being provided with apertures at the points of intersection thereof, active members in the form of unit elements provided with projections or trunnions at their central portions adapted to be supported in the apertures at the intersections of the cross-ribs on the frames, and means for securing the frames together.

4. A Planté battery-plate comprising frames having sides and ends and transverse and longitudinal ribs, active unit elements in the form of grills supported at their central portions on the intersections of the ribs on the frames, and means for securing the frames together.

5. A Planté battery-plate comprising frames having sides and ends and transverse and longitudinal cross-ribs provided with apertures at their intersections, active unit elements in the form of grills comprising strips connected to diagonal or cross supports, projections or trunnions at the centers of said grills, said trunnions being adapted to coöperate with the apertures at the intersections of the cross-ribs on the frames for supporting the grills centrally between the frames, said grills being supported without touching each other and without touching the frames except at their central portions.

6. A Planté battery-plate comprising frames having sides and ends and transverse and longitudinal cross-ribs provided with apertures at their intersections, active unit elements in the form of grills comprising strips connected to diagonal or cross supports, projections or trunnions at the centers of said grills, said trunnions being adapted to coöperate with the apertures at the intersections of the cross-ribs on the frames for supporting the grills centrally between the frames, said grills being supported without touching each other and without touching the frames except at their central portions, and means for centering said grills upon the frames.

7. A Planté battery-plate comprising frames having sides and ends and transverse and longitudinal cross-ribs provided with apertures at their intersections, active unit elements in the form of grills comprising strips connected to diagonal or cross supports, projections or trunnions at the centers of said grills, said trunnions being adapted to coöperate with the apertures at the intersections of the cross-ribs on the frames for supporting the grills centrally between the frames, said grills being supported without touching each other and without touching the frames except at their central portions, and recesses or grooves in said grills adapted to coöperate with the ribs on the frames for centering said grills.

8. A battery-plate comprising active members in the form of unit elements, perforated frames inclosing said elements, and means for supporting said elements centrally on the perforated frames whereby the elements are free to expand in all directions.

9. A battery-plate comprising perforated frames having cross-ribs thereon, active members in the form of grills, and means for supporting said grills centrally at the intersections of the cross members on the frames, and means for securing the frames together.

10. A battery-plate comprising frames having sides and ends and intersecting ribs, active members in the form of unit elements supported at their central portions upon the intersections of said ribs, and means for preventing said elements from warping out of the plane of the plate.

In testimony whereof I have signed this specification in the presence of two subscribing witnesses.

JOSEPH BIJUR.

Witnesses:
OLIN A. FOSTER,
A. L. O'BRIEN.